March 10, 1936.                    H. W. SHONNARD                       2,033,308
                                STEP FOR MOVING STAIRWAYS
                                  Filed Aug. 4, 1934                 2 Sheets-Sheet 1
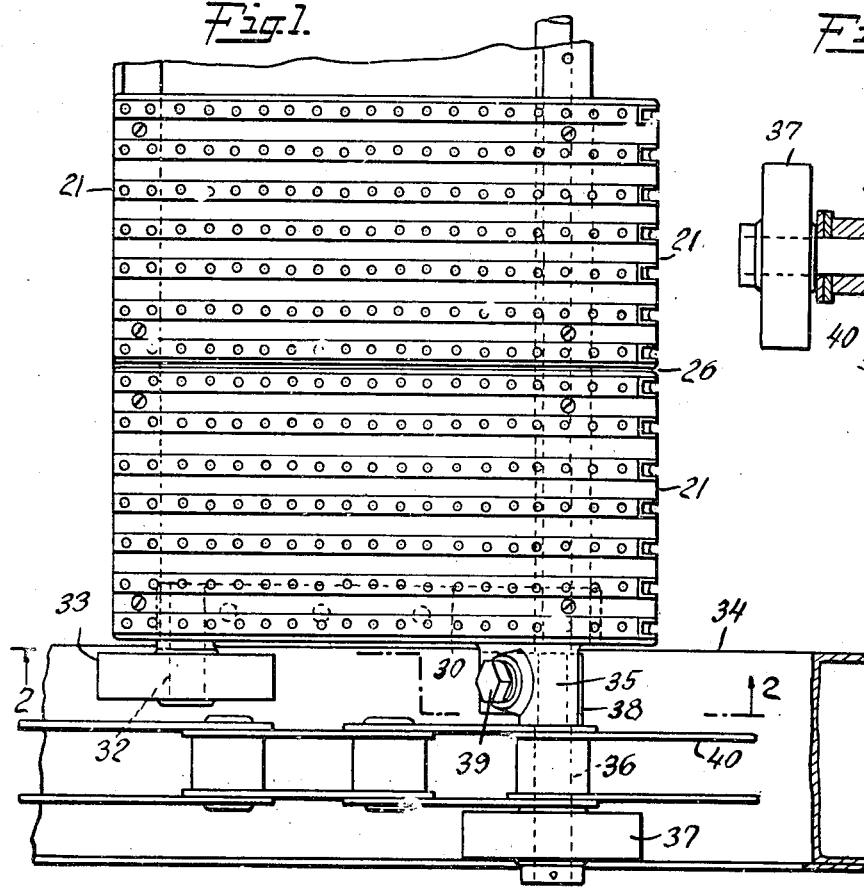
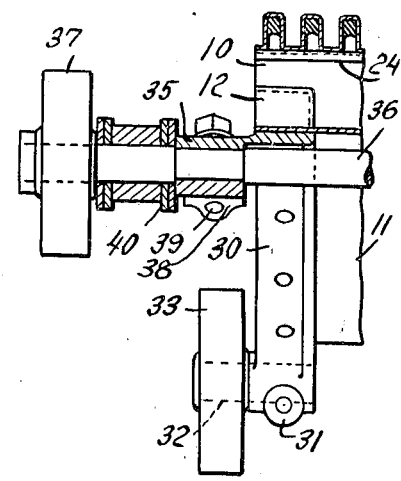
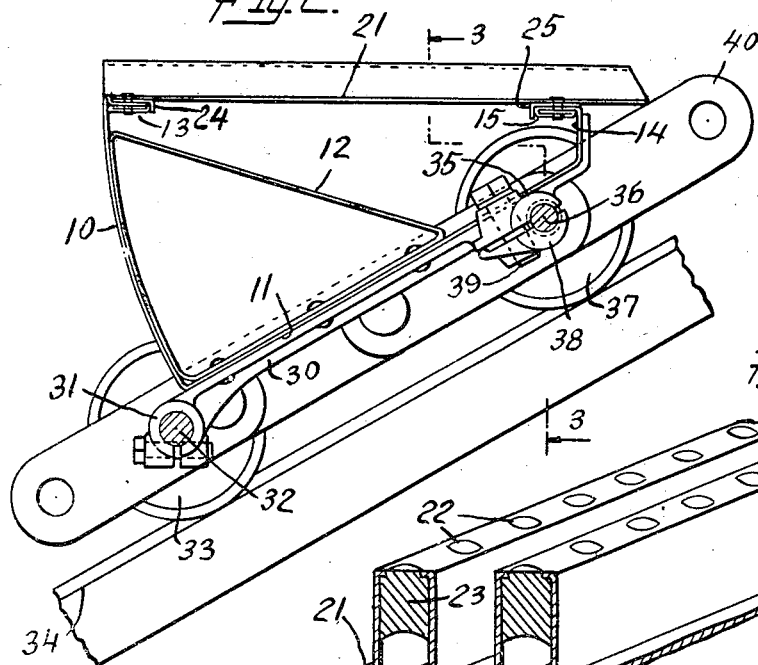
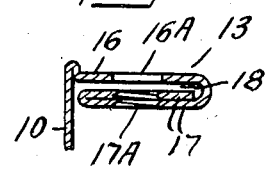
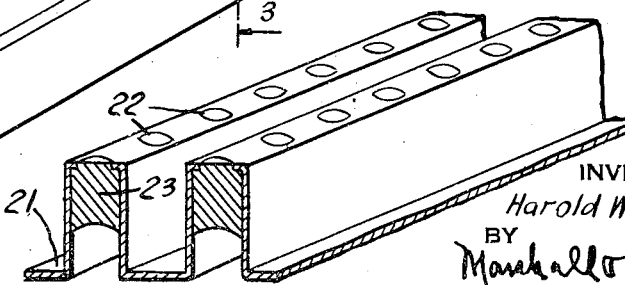
INVENTOR
Harold W. Shonnard
BY
ATTORNEYS

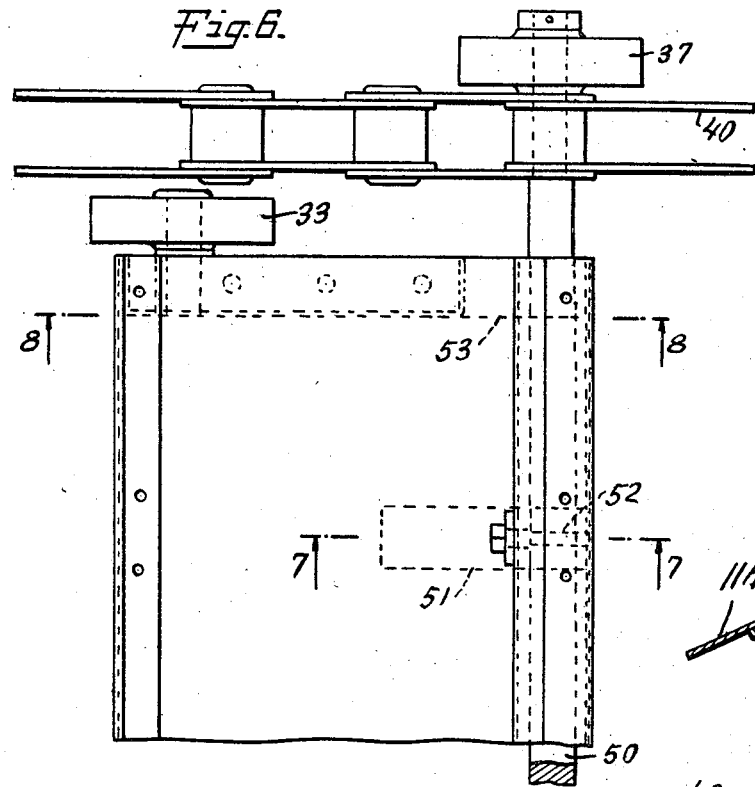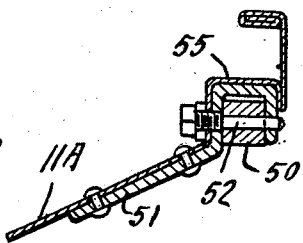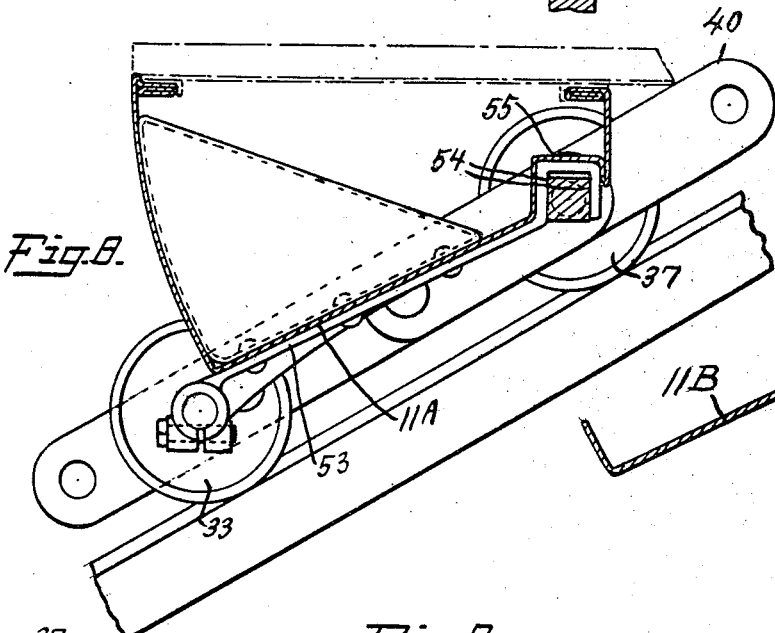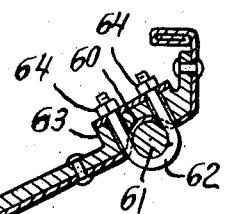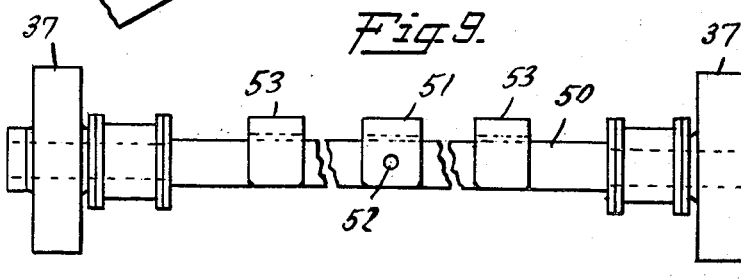

Patented Mar. 10, 1936

2,033,308

UNITED STATES PATENT OFFICE 2,033,308

STEP FOR MOVING STAIRWAYS

Harold W. Shonnard, Montclair, N. J.

Application August 4, 1934, Serial No. 738,483

26 Claims. (Cl. 198—16)

This invention relates to improvements in steps for moving stairways.

Its object is to provide a wheel supported step which is light in weight and suitable for production at reduced cost. Another object is to provide a step which will run on guides more efficiently and quietly than those which have been available heretofore.

In former structures the rigidity of the supports for the wheels with reference to a pair of wheels at each side of a step, has required that the perimeters of each pair of wheels be in precisely parallel planes, in order that each of the four wheels shall bear its share of the weight imposed on the step, during the load bearing run. For the same reason it has been necessary to erect the inclined and curved portions of the tracks and the semi-circular guides at the ends thereof, which together form endless loops at each side of the steps, in such perfect alignment that all of the step supporting wheels will follow them equally. Regardless of the initial accuracy of alignment of the tracks attained during erection of the stairway, subsequent uneven wearing of the step wheels and distortion of the track alignment resulting from the settling of the track supporting structure, causes the failure of one of the four wheels of the step to maintain contact with its track and thereby fail to carry its proportion of the imposed load, and if the curved guides are not initially matched and installed with precision, the step wheels will have too much freedom, or too much friction, causing noisy operation or requiring more power to operate the steps than should be necessary.

According to the present invention these difficulties have been overcome by making the supports for the wheels relatively movable so that each wheel will accommodate itself to all parts of the track over which it runs, with the result that it will bear its part of the load and the tendency to bind will be eliminated. My improved step is also of light but strong construction, has a high factor of safety and is so made that its parts are readily accessible. More specifically, an object of the invention is to provide a four wheel flexible step which shall possess the foregoing advantages.

These and other objects will appear in the following specification in which I will describe the invention, the novel features of which will be pointed out in appended claims.

Referring to the drawings,

Fig. 1 is a plan view of one end of a step which is made according to and embodies my invention, together with a part of a supporting track and a driving chain;

Fig. 2 is a side elevation of the parts shown in Fig. 1;

Fig. 3 is an end elevation of the same parts, except the track. Some of the parts are shown in section, the section being taken on the line 3—3 of Fig. 1;

Fig. 4 is a perspective view of a part of the tread shown in the preceding figures;

Fig. 5 is a fragmentary sectional elevation of the upper end of the frame which forms the riser. This figure illustrates a detail of construction;

Fig. 6 is a plan view similar to Fig. 1 which shows a modification of construction which also embodies this invention;

Fig. 7 is a sectional side elevation of some of the parts shown in Fig. 6, the section being taken on the line 7—7 of the latter figure;

Fig. 8 is a sectional side elevation of some of the parts shown in Fig. 6, the section being taken on the line 8—8 of Fig. 6;

Fig. 9 is an end elevation of the upper wheels and their axle with the driving chains, one of which is shown in section; and Fig. 10 is a sectional side elevation of parts of a step of still further modified construction which also embodies my invention.

Referring first to Figs. 1–5, a supporting frame of sheet metal is shown which comprises a curved riser 10 and a flat base plate 11. Between these two parts and affixed to them is a flanged bracket 12. One or more of these brackets may be provided. The upper end of the riser is bent as shown at 13 in Fig. 2, and more in detail in Fig. 5 to form a flange for supporting one edge of the tread. The opposite or upper end of the base plate is bent upwardly as at 14, and then back as at 15, to form a flange for supporting the other edge of the tread.

Although the base plate 11, is shown as integral with the riser 10, and the bent up portion 14 and the flanges 13 and 15, it is obvious that each of said members may be made separately and joined together and the base plate 11 may, for convenience in production, be made in two sections joined together by the bolsters 30, without departing from the spirit of the invention or loss of the advantages attained by the construction shown.

The tread, as shown in these figures, comprises corrugated plates affixed to the flanges 13 and 15 by screws. The plates 21 are constructed of sheet metal bent to form alternate ribs and grooves, as shown in detail in Fig. 4. The upper surfaces of the ribs are perforated, as at 22, and a plastic material such as rubber 23 is placed within the ribs to fill the ends of the ribs and the perforations 22. 24 and 25 are transverse angle strips welded to the underside of plate 20 to increase its thickness and to aid in positioning it on the flanges 13 and 15.

Fig. 5 shows in detail the construction of the tread-bearing flanges. The metal is bent to form an upper layer 16 with a clearance hole 16A in it and two parallel abutting layers 17 in which is a tapped hole 17A. A space 18 is left between the under surface of the layer 16 and the upper surface of the adjacent layer 17. By means of this novel construction, when the screws which hold the ribbed comb 21 in place are inserted, the layers 17 are drawn up to close the space 18 and this forms an effective lock for the screws.

The entire tread as thus constructed is flexible. I prefer to make it of a plurality of corrugated plates 21 placed side by side with a space 26 between them, as shown in Fig. 1. When the tread is thus made in sections, a more rigidly constructed tread may be used without destroying the desired flexibility of the step.

30 is a truck bolster for supporting the wheels. At its rear end it is constructed to form a pinch socket 31 for a stub-axle 32 for one of the trailer wheels 33. The trailer wheels are close to the sides of the step and run on a track 34.

At its other end the truck bolster forms the upper part 35 of a seat for the axle 36 of the front wheels 37. These also run on the track 34. The part of the shaft supported in this seat is of less diameter than the parts on each side of it, so that the shaft is held against axial movement in the seat. The underside of the shaft seat is closed by a separate removable member 38 secured to the bolster truck by a bolt 39.

The seat thus formed is beyond the end of the step. Shaft 36 is extended through a driving chain 40 and the wheels 37 are outside of the chain. By means of this construction, which is clearly shown in Figs. 1 and 3, the bolt 39 and member 38 can be removed readily and the whole step removed, without first removing the tread, as the bolt 39 is accessible from the upper side of the bearing 35 and beyond the outer edges of the tread. The axle 36 in the chain and the wheels 37 will then be left on the track. Access to the bolt 39 may be had by merely removing an adjacent part of the balustrade casing.

The bolster frame is riveted to the base plate 11 near one of its edges. It is to be understood that there is a similar bolster frame with its associated parts, on the other side of the base plate.

The structure thus described is light and strong and in addition to the advantages already pointed out is flexible. This allows the axle 36 to rock in a direction normal to the track 34. That means that it can move relative to its normal relation of parallelism with the stub axles 32 sufficiently to permit the wheels 37 to accommodate themselves to inaccuracies of alinement of the tracks. It also means that if one of the wheels is out of contact with its track or is not positioned to bear its share of the weight on the step, sufficient weight applied to the tread will distort the step enough to overcome this condition.

In the construction shown in Figs. 6-8, the front wheels 37 are supported on a centrally pivoted axle 50. The central part of this axle is rectangular, as shown, and its ends which pass through the chains 40 and the wheels 37 are round. 51 is a bracket riveted to the underside of base plate 11A in the central forward part thereof. This bracket is constructed with vertical sides between which axle 50 fits. A bolt 52 pivots the axle to the bracket (Fig. 7).

In this case each truck bolster 53 is arranged to support the trailer wheels 33 in any desired way and their other ends are shaped to form vertical channel guides 54 for the axle 50. The forward part of the base plate 11A is formed with a transverse channel 55 over the bracket 51 and the guides 54.

With this construction the weight of the step or of its tread which is borne by the forward wheels is equally distributed between them whether or not the step is made of the flexible construction shown. The shaft will also rock to permit wheels 37 to accommodate themselves to any inequalities in the tracks.

In the other construction, shown in Fig. 10, the base plate 11B is constructed with a semi-circular transverse groove 60 in which lies a cylindrical shaft 61. 62 is a shackle welded or otherwise permanently affixed to the shaft. This passes through base plate 11B and through a bracket 63 riveted to the central forward part of the base plate in a position corresponding to that of bracket 51 in Fig. 6. If desired, two or more of such shackles and brackets may be provided. 64 designates nuts by which the shackle and shaft are affixed to the bracket and base plate. These are accessible from the top of the step when the part or parts of the tread above them are removed.

The fact that the shackle is permanently affixed to the shaft prevents axial movement of the shaft and keeps the shackle from dropping off when the step is removed from the shaft. In this construction, the flexibility of the step provides the desired self-adjustment of the rollers.

Several embodiments of this invention have been illustrated and described in order to show that it is not limited to any specific construction. No limitations are intended other than those necessitated by the prior art and by the spirit of the following claims.

What I claim is:

1. A step for moving stairways having a frame comprising a flexible base plate, a pair of wheels for supporting one end of the base plate and another pair of wheels at the sides of the other end of the base plate.

2. A step for moving stairways having a frame comprising a flexible base plate, a riser at one end of the base plate, a pair of wheels arranged to support the riser end of the frame, an axle disposed transversely across the other end of the base plate, and a pair of wheels on the axle.

3. A step for moving stairways having a frame comprising a flexible base plate, truck bolsters on opposite edges of the base plate, and wheels supported near the ends of each bolster.

4. A step for moving stairways having a frame comprising a flexible base plate, truck bolsters on opposite edges of the base plate, wheels supported near one end of each bolster, an axle supported near the other end of the bolsters, and wheels on said axle.

5. A step for moving stairways having a frame comprising a sheet metal base plate, a pair of wheels for supporting one end of the base plate, a transverse channel formed in the base plate near the other end thereof, an axle supported by said channel, and means for securing the axle in said channel.

6. A step for moving stairways having a frame comprising a sheet metal base plate, a pair of wheels for supporting one end of the base plate, a transverse channel near the other end of the base plate, an axle in said channel, a shackle affixed to the axle and protruding through the base plate, and means above the base plate for securing the axle to the base plate.

7. A step for moving stairways having a frame and a tread at the top of the step on said frame, a pair of wheels arranged to support one end of the frame, an axle for supporting the other end of the frame, and means readily accessible beyond the sides of the tread for detachably securing the frame to the axle without removing the tread at the top of the step or working from outside the stairway.

8. A step for moving stairways comprising a sheet metal base plate, wheels supported thereby, a sheet metal riser projecting upwardly from said base plate, a flange at the upper edge of the riser, a flange at the edge of the base plate opposite the riser, and a tread on said flanges.

9. A step for moving stairways comprising a sheet metal base plate, a sheet metal riser, a flange at the upper edge of the riser, a flange at the edge of the base plate opposite the riser, said flanges being formed by bending sheet metal to form separated parallel layers, screw clearance holes in the upper layer, threaded holes in the lower layer in alinement with the clearance holes, a tread seated on said flanges and screws through the tread in said holes.

10. A step for moving stairways comprising a sheet metal base plate, a sheet metal riser, a flange on the upper edge of the riser, a flange on the edge of the base plate opposite the riser, said flanges being formed by bending the sheet metal of the base plate and riser to form separated parallel layers, screw clearance holes in the upper layer, threaded holes in the lower layer in alinement with the clearance holes, a sheet metal tread seated on said flanges and screws through the tread in said holes.

11. A step for moving stairways comprising a flexible tread bent to form parallel alternate ribs and grooves and a transverse member affixed to the underside thereof to prevent spreading.

12. A step for moving stairways comprising a flexible sheet metal tread bent to form parallel alternate ribs and grooves, perforations through the upper parts of the ribs, and a plastic material in the ribs and perforations.

13. In moving stairways, a pair of parallel spaced driving members, a step comprising a frame supported at one end on an axle carried by said driving members and disposed transversely across the frames between the driving members, a pair of wheels near the other end of the frame, and means for pivotally attaching the frame to the axle to permit movement of the axle about substantially a horizontal axis.

14. In moving stairways, a pair of parallel spaced driving members, a step comprising a base plate supported at one end on an axle carried by said driving members and disposed transversely across the base plate between the driving members, a pair of wheels near the other end of the base plate, and means for pivotally attaching the base plate to the axle to permit movement of the axle about a substantially horizontal axis.

15. In moving stairways, a pair of parallel spaced driving members, a step comprising a frame supported at one end on an axle carried by said driving members and disposed transversely across the frame between the driving members, a pair of wheels near the other end of the frame, a tread at the top of the step on said frame, a bearing on each side of the frame extending laterally beyond the tread, and readily accessible detachable means positioned beyond the sides of the tread between the driving members for securing the bearings to the axle without removing the tread at the top of the step, or working from outside the stairway.

16. A step for moving stairways having a frame comprising a sheet metal base plate, a pair of wheels for supporting one end of the base plate, an axle disposed transversely across the other end of the base plate, a shackle affixed to the axle and protruding through the base plate, and means above the base plate for securing the shackle to the base plate.

17. A step for moving stairways comprising a sheet metal base plate, wheels supported thereby, a sheet metal riser projecting upwardly from one side of said base plate, and means for securing a tread to the riser and to the opposite edge of the base plate.

18. A step for moving stairways having a frame comprising a sheet metal base plate, wheels for supporting one end of the base plate, a riser at one edge of the base plate and a tread attached at one edge to the riser and at the other edge to the opposite edge of the base plate.

19. A step for moving stairways having a frame comprising a riser having a flange at its upper edge, truck bolsters affixed to opposite sides of the lower portion of the riser, wheels supported near the riser end of each bolster, an axle supported near the other end of each bolster, wheels on said axle, a tread affixed near one edge to said flange, and a support between the opposite edge of the tread and the axle bearing ends of the bolsters spaced from the flange and connected therewith by the tread.

20. A step for moving stairways having a frame comprising a tread, a riser at one end of the tread, a flange at the upper edge of the riser for the tread, a flange at the lower edge of the riser, a support for the other end of the tread, a flange for the tread at the upper edge of said support, a flange at the lower edge of said support, and truck bolsters having axles and wheels attached to the lower flange of said support and to the lower flange of said riser.

21. A step for moving stairways having a frame comprising a sheet metal base plate, wheels for supporting one end of the base plate, a riser at one edge of the base plate, a brace secured to the base plate and to the riser, and a tread attached at one edge to the riser and at the other edge to the opposite edge of the base plate.

22. A step for moving stairways having a frame comprising a riser, truck bolsters affixed to opposite sides of the lower portion of the riser, a brace secured to the riser and to the truck bolsters, wheels supported near the riser end of each bolster, an axle supported near the other end of each bolster, wheels on said axle, a tread affixed near one edge to the upper portion of the riser, and a support between the other edge of the tread and the axle bearing ends of the bolsters spaced from the upper portion of the riser and connected therewith by the tread.

23. A step for moving stairways having a frame comprising a riser having a flange at its upper edge, formed of sheet metal in separate parallel layers, screw clearance holes in the outer layer, threaded holes in the inner layer in alinement with the clearance holes, truck bolsters affixed to opposite sides of the lower portion of the riser, wheels supported near the riser end of each bolster, an axle supported near the other end of each bolster, wheels on said axle, a tread seated on said flange secured thereto by screws through the tread in the holes of the flange, and a support between the other edge of the tread and the axle bearing ends of the bolsters spaced from the flange and connected therewith by the tread.

24. A step for moving stairways having a frame, a tread at the top of the step on said frame, a pair of wheels arranged to support one end of the frame, an axle and wheels for supporting the other end of the frame, seats for the axle extended beyond the sides of the tread and affixed to the frame, and attachable clamps for the extended portion of the seats that may be readily affixed thereto, to permit of securing the axle to the seats without removing the tread at the top of the step, or working from outside the stairway.

25. A step for moving stairways having a frame comprising a sheet metal base plate, a pair of wheels for supporting one end of the base plate, an axle and wheels for supporting the other end of the base plate, a riser at one end of the base plate, a tread attached near one of its edges to the riser and near its other edge to the opposite end of the base plate, seats for the axle extended beyond the sides of the tread, affixed to the base plate and attachable clamps for the extended portion of the seats that may be readily affixed thereto, to permit of securing the axle to the seats without removing the tread or working from outside of the stairway.

26. A step for moving stairways having a frame and a tread at the top of the step on said frame, a pair of wheels arranged to support one end of the frame, an axle and wheels for supporting the other end of the frame, seats for the axle extended beyond the sides of the tread affixed to the frame, and locating means on the axle for positioning the axle in the seats and attachable clamps for the extended portion of the seats that may be readily affixed thereto, to permit of securing the axle to the seats without removing the tread or working from outside of the stairway.

HAROLD W. SHONNARD.